United States Patent [19]

Mauve et al.

[11] Patent Number: 5,401,941
[45] Date of Patent: Mar. 28, 1995

[54] APPARATUS FOR THE INDUCTIVE CROSS-FIELD HEATING OF FLAT MATERIAL

[75] Inventors: Hans W. Mauve; Wolfgang Andree, both of Lünen, Germany

[73] Assignee: ABB Patent GmbH, Mannheim, Germany

[21] Appl. No.: 136,441

[22] Filed: Oct. 13, 1993

[30] Foreign Application Priority Data

Oct. 13, 1992 [DE] Germany .............. 42 34 406.9

[51] Int. Cl.⁶ .............................................. H05B 6/40
[52] U.S. Cl. ................... 219/645; 219/656; 219/670; 219/667; 219/673
[58] Field of Search ............ 219/645, 656, 646, 671, 219/670, 667, 673, 675

[56] References Cited

U.S. PATENT DOCUMENTS

| | | |
|---|---|---|
| 3,444,346 | 5/1969 | Russell et al. . |
| 3,705,285 | 12/1972 | Cachat . |
| 4,357,512 | 11/1982 | Nishimoto et al. ............... 219/667 |
| 4,708,325 | 11/1987 | Georges ............... 219/645 |
| 4,788,396 | 11/1988 | Maugein et al. ............... 219/645 |
| 4,891,484 | 1/1990 | Waggott et al. ............... 219/645 |
| 5,156,683 | 10/1992 | Ross ............... 219/645 |

FOREIGN PATENT DOCUMENTS

| | | |
|---|---|---|
| 0246660 | 11/1987 | European Pat. Off. . |
| 119820 | 5/1976 | Germany . |
| 2155740 | 9/1985 | United Kingdom . |
| 396394 | 8/1973 | U.S.S.R. . |
| 1073902 | 2/1984 | U.S.S.R. . |
| 8501532 | 4/1985 | WIPO . |

OTHER PUBLICATIONS

Metall Publ. Aug. 1989, pp. 750–754, Wilden et al. "Induktive Hochleistungsglühanlagen Für Die Kont," German Search Report.

*Primary Examiner*—Philip H. Leung
*Attorney, Agent, or Firm*—Herbert L. Lerner; Laurence A. Greenberg

[57] ABSTRACT

An apparatus for the inductive cross-field heating of flat material includes a plurality of mutually opposite induction loops being disposed above and below the flat material. At least one pair of induction modules is formed of two induction modules being adjustable independently of one another in their position relative to the flat material. Each induction module has two mutually opposite U-shaped induction loops having geometries and dimensions which are invariable, base legs which can be positioned in such a way that they terminate at least a predeterminable distance in front of one edge of the flat material and within the width of the flat material, and two side legs which can be positioned in such a way that they project at least a predeterminable distance beyond the other edge of the flat material. The induction loops of the two induction modules of a pair of induction modules are open towards oppositely directed sides, with the result that the side legs of only one induction loop project beyond each edge of the flat material.

10 Claims, 2 Drawing Sheets

APPARATUS FOR THE INDUCTIVE CROSS-FIELD HEATING OF FLAT MATERIAL

BACKGROUND OF THE INVENTION

FIELD OF THE INVENTION

The invention relates to an apparatus for the inductive cross-field heating of flat material, including a plurality of mutually opposite induction loops being disposed above and below the flat material, some of the induction loops projecting beyond the edges of the flat material, and others of the induction loops terminating within the width of the flat material.

Such an apparatus for the inductive cross-field heating of flat material is known from Published European Application No. 0 246 660. There, an overall configuration being formed of main coils and auxiliary coils is proposed. The main coils are disposed perpendicularly to the direction of movement of the flat material and project beyond the two outer edges of the flat material. The auxiliary coils extend parallel to the direction of movement of the flat material and are disposed in the vicinity of the edges of the flat material, but without projecting beyond them. The combination of main and auxiliary coils achieves a uniform temperature profile over the entire width of the flat material. The main coils in particular heat the middle region and the two immediate edge regions of the flat material, but zones of lower temperature occur in the vicinity of the edges and parallel to them. The zones in the vicinity of the edges are reheated by the auxiliary coils, so that the necessary uniform temperature distribution is established over the entire width of the flat material.

Since the main coils and in particular also the auxiliary coils have to be matched to the width of the flat material to be heated, mechanical devices must be provided for adjusting the coil width. The auxiliary coils in particular must be capable of being matched exactly to the width of the flat material, in order to reheat the zones of lower temperatures in the vicinity of the edges and parallel thereto in the desired way. The matching of the main and auxiliary coils to the width of the flat material is complicated and labor-intensive. If a non-uniform and unsatisfactory temperature profile is measured over the: width of the flat material during the cross-field heating, no readjustment is possible during operation.

SUMMARY OF THE INVENTION

It is accordingly an object of the invention to provide an apparatus for the inductive cross-field heating of flat material, which overcomes the hereinafore-mentioned disadvantages of the heretofore-known devices of this general type, which can be used universally for flat material of differing width and which allows a rapid matching to the desired width of flat material and to the heating capacity required.

With the foregoing and other objects in view there is provided, in accordance with the invention, an apparatus for the inductive cross-field heating of flat material, comprising at least one pair of induction modules being adjustable in position independently of one another relative to a flat material to be heated, the flat material having edges defining a width; each of the induction modules including two mutually opposite U-shaped induction loops having invariable geometries and dimensions and being disposed above and below the flat material, the induction loops having base legs to be positioned for terminating at least at a predeterminable distance in front of one of the edges of the flat material and within the width of the flat material, and the induction loops having two side legs to be positioned for projecting at least at a predeterminable distance beyond the other of the edges of the flat material; and the induction loops of the pair of the induction modules being open towards oppositely directed sides with the side legs of the induction loops each projecting beyond a respective one of the edges of the flat material.

The advantages which can be afforded by the invention are, in particular, that the apparatus for the inductive cross-field heating of flat material can be matched in a very flexible way to different parameters of the flat material and of the induction process, such as the width, thickness, entry temperature and run-through speed of the flat material. The induction modules are all constructed identically and are dimensioned in such a way that a respective induction module can be pushed in between two support rollers serving to support the flat material. Matching to the width of the flat material is carried out by displacing the modules perpendicularly to the direction of run-through movement of the flat material, in such a way that the base legs of the induction loops are disposed above the zones in the vicinity of the edges of the flat material, at which too low a temperature would occur if heating took place solely by means of the side legs projecting beyond the edges of the flat material. The geometrical configuration of the induction loops of the modules does not have to be varied for this purpose. Advantageously, all of the induction modules reach over the flat material from only one side, so that a feed of the flat material into the apparatus for inductive cross-field heating and extraction therefrom are possible in a very simple way. The mechanical mounting of the structural components carrying the induction loops and the electrical energy supply of the induction loops take place from one side. The identical construction of the induction modules results in price benefits in production and in benefits with regard to the maintenance of stock of replacement parts. Only one type of induction module need be planned, produced and kept in stock for different uses.

The number of pairs of induction modules used in an installation for the inductive heating of flat material depends on the thickness, width, entry temperature and run-through speed of the flat material and on the temperature to be achieved in the flat material.

Furthermore, the advantages which can be afforded by the apparatus for the inductive cross-field heating of flat material are that the positions of the induction loops can be varied independently of one another during operation for optimization purposes, with the effect of fine adjustment, in order to obtain as uniform a temperature profile as possible over the width of the flat material.

In accordance with another feature of the invention, each of the induction modules has a framework with an upper supporting arm and a lower supporting arm for mounting the two induction loops.

In accordance with a further feature of the invention, there are provided lamination bundles each being associated with a respective one of the induction loops for mounting the induction loops on the frameworks.

In accordance with an added feature of the invention, there are provided means associated with the frameworks for varying the position of the induction loops relative to the flat material.

In accordance with an additional feature of the invention, the induction loops are adjustable relative to the supporting arms.

In accordance with yet another feature of the invention, there are provided lamination-bundle suspensions on the supporting arms serving as guide means for adjusting the induction loops.

In accordance with yet a further feature of the invention, there are provided drive devices for adjusting the induction loops.

In accordance with a concomitant feature of the invention, there is provided a temperature-profile measuring device for recording a temperature profile of the flat material after inductive cross-field heating has taken place, and a position controller receiving the temperature profile from the measuring device, receiving a predetermined desired profile and controlling the drive devices for adjusting the position of the induction loops independently of deviations between the recorded temperature profile and the predetermined desired profile.

Other features which are considered as characteristic for the invention are set forth in the appended claims.

Although the invention is illustrated and described herein as embodied in an apparatus for the inductive cross-field heating of flat material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
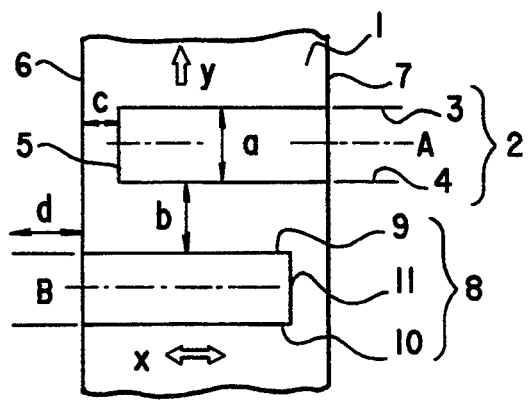
FIG. 1 is a fragmentary, diagrammatic, top-plan view of a flat material with two induction loops.

Referring now to the figures of the drawing in detail and first, particularly, to FIG. 1 thereof, there is seen a top view of a flat material having two induction loops (with lamination bundles removed). FIG. 1 illustrates a flat material 1 to be heated, preferably a strip of a material which can be influenced inductively, and above which two upper induction loops 2, 8, each having an invariable geometrical shape, are disposed. The upper induction loop 2 of a first induction module is formed of two parallel side legs 3 and 4 being directed perpendicularly to a direction of movement y of the flat material 1 and having a pole distance a, and a base leg 5 connecting the two side legs at right angles. It is essential that the base leg 5 be located above the flat material at a predetermined distance c from a first edge 6 of the flat material 1. In other words, under no circumstances does the base leg 5 project beyond the flat material itself. However, the side legs 3, 4 project beyond a second edge 7 of the flat material 1 at least by a predetermined projecting length d, that is to say the actual projection can exceed this length d, but under no circumstances can it fall short of it.

The upper induction loop 8 of a second induction module, which is located at a distance from the upper induction loop 2 of the first induction module, is likewise formed of two parallel side legs 9 and 10 being directed perpendicularly to the direction of movement y of the flat material 1 and having the pole distance a, and a base leg 11 connecting the two side legs 9, 10 at right angles. At the same time, the base leg 11 is located above the flat material 1 and at the distance c from the second edge 7 of the flat material, without projecting beyond the second edge 7 itself. However, the side legs 9, 10 project beyond the first edge 6 of the flat material at least by the projecting length d.

As can be seen, each induction loop projects beyond only one edge of the flat material 1. The side legs 3, 4 heat the middle region of the flat material 1 and its edge 7. The side legs 9, 10 heat the edge 6 of the flat material and likewise the middle region. The base leg 5 serves for heating the zone in the vicinity of and parallel to the edge 6. The base leg 11 heats the zone in the vicinity of and parallel to the edge 7.

Figure 2:
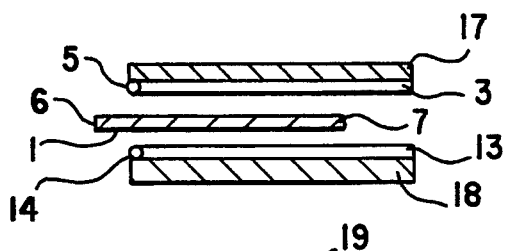
FIGS. 2 and 3 are longitudinal-sectional views respectively taken along section lines A and B of the configuration according to FIG. 1.
Figure 3:
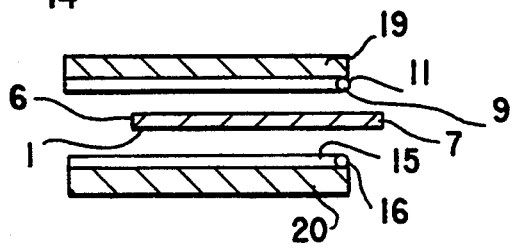

FIGS. 2 and 3 show sections through the configuration according to FIG. 1. The configuration according to FIG. 2 is a section taken along the line A according to FIG. 1, and the configuration according to FIG. 3 is a section taken along the line B according to FIG. 1.

The flat material 1 with its two edges 6, 7 can be seen in the two FIGS. 2 and 3. Furthermore, FIG. 2 illustrates the side leg 3, the base leg 5 and a lamination bundle 17 of the upper induction loop 2 of the first induction module. Located underneath the upper induction loop 2 is an identically constructed lower induction loop, of which a first side leg 13, a base leg 14 and a lamination bundle 18 can be seen. The distances a, c, d defined for the upper induction loop 2 also apply to the lower induction loop.

FIG. 3 illustrates the side leg 9, the base leg 11 and the lamination bundle 19 of the upper induction loop 8 of the second induction module. Below this upper induction loop is located an identically constructed lower induction loop, of which a first side leg 15, a base leg 16 and a lamination bundle 20 can be seen. The distances a, c, d defined for the upper induction loop 8 also apply to the lower induction loop. The induction loops are preferably fixedly connected to the associated lamination bundles.

Figure 4:
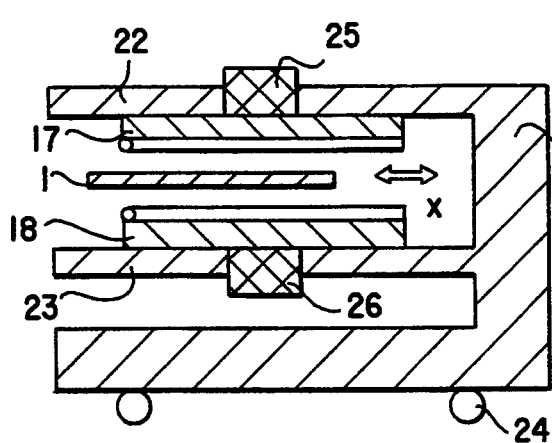
FIGS. 4 and 5 are longitudinal-sectional views through induction modules.
Figure 5:
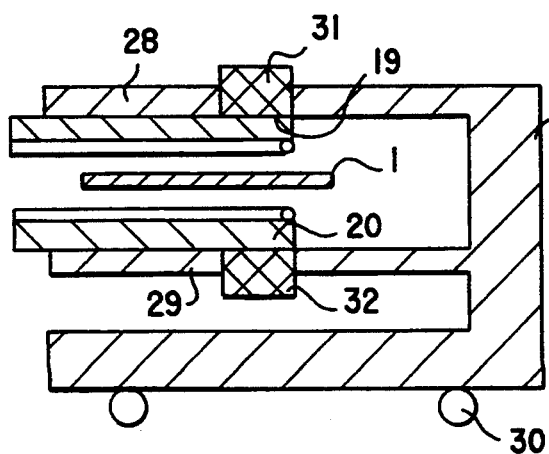

FIGS. 4 and 5 show sections through two induction modules. An induction module C shown in FIG. 4 has the induction loops described in detail above with regard to FIGS. 1 and 2, together with the lamination bundles 17, 18. An induction module D shown in FIG. 5 has the induction loops described in particular above with regard to FIGS. 1 and 3, together with the lamination bundles 19, 20. Each induction module is formed of a framework with respective upper and lower supporting arms for fastening the induction-loop/lamination-bundle configurations. The positioning of the induction modules relative to the flat material 1 in a direction x perpendicular to the direction of movement y of the flat material is made possible in a simple way. In order to provide approximate positioning, the frameworks of the induction modules are provided, for example, with lockable rollers, as a result of which the position setting of the induction loops in relation to the flat material can take place due to the displacement of the induction modules themselves. In order to provide fine positioning, drive devices are provided on the upper and lower supporting arms of the frameworks for allowing a continuous adjustment of the lamination bundles and therefore of the induction loops in relation to the flat material, with the position of the induction modules relative to the flat material remaining unchanged and only a variation in position between the supporting arms and the lamination bundles/induction loops taking place.

In particular, the induction module C according to FIG. 4 has a framework 21 with an upper supporting arm 22, a lower supporting arm 23 and rollers 24 for approximate positioning. A drive device 25 fastened to the upper supporting arm 22 serves for the fine positioning of the lamination bundle 17 and therefore of the upper induction loop. A drive device 26 fastened to the lower supporting arm 23 serves for the fine positioning of the lamination bundle 18 and therefore of the lower induction loop.

It is evident from FIG. 5 that the induction module D has a framework 27 with an upper supporting arm 28, a lower supporting arm 29 and rollers 30 for approximate positioning. A drive device 31 fastened to the upper supporting arm 28 serves for the fine positioning of the lamination bundle 19 and therefore of the upper induction loop. A drive device 32 fastened to the lower supporting arm 29 serves for the fine positioning of the lamination bundle 20 and therefore of the lower induction loop.

Figure 6:
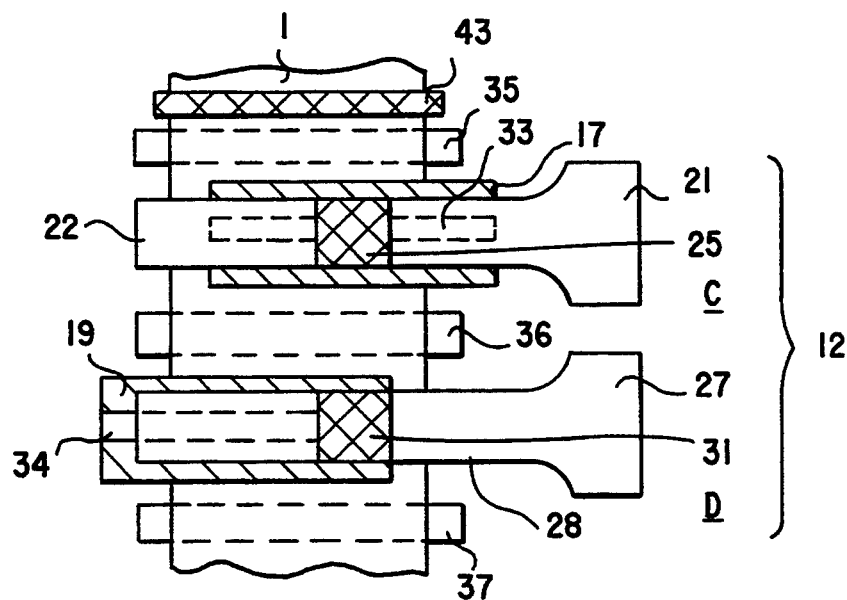
FIG. 6 is a fragmentary, top-plan view of a flat material with two induction modules.

FIG. 6 shows a top view of a flat material to be heated, together with two induction modules. The induction module C with the framework 21, the upper supporting arm 22 and the drive device 25 as well as the induction module D with the framework 27, the upper supporting arm 28 and the drive device 31 can be seen. In order to fasten the lamination bundles 17 and 19 to the supporting arms 22 and 28, the lamination bundles 17 and 19 are provided with respective lamination-bundle suspensions. 33 and 34 which are mounted movably in corresponding suspension devices of the supporting arms and into which the drive devices 25 and 31 engage force-lockingly. A force-locking connection is one which connects two elements together by force external to the elements, as opposed to a form-locking connection which is provided by the shapes of the elements themselves.

As can be seen, each of the induction modules C, D is located between two respective support rollers 35, 36 and 36, 37 which are provided for holding the flat material 1, so that the distance b between the induction loops of the two adjacent induction modules is predetermined by the distance between these support rollers. The two induction modules C, D form a first pair of induction modules 12.

Figure 7:
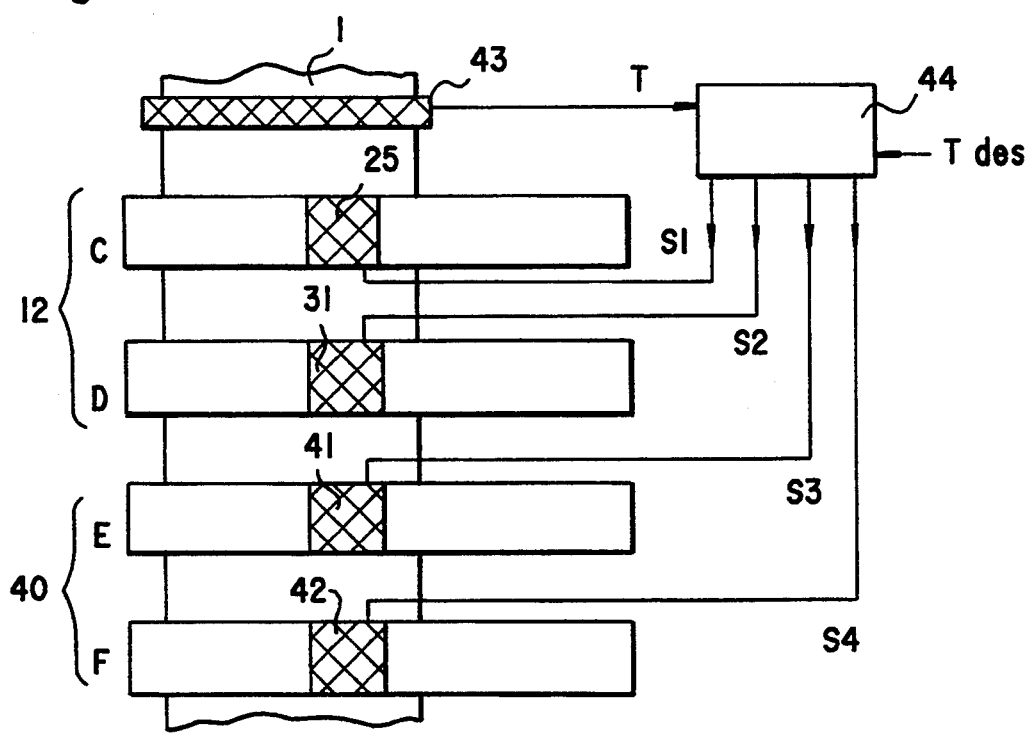
FIG. 7 is a fragmentary, top-plan view of a basic regulating device for the induction modules.

FIG. 7 illustrates a basic position-regulating device for the induction modules. The pair of induction modules 12 and a pair of induction modules 40 are provided in the example. The pair of induction modules 12 includes the induction modules C and D and the pair of induction modules 40 includes induction modules E and F. The use of further pairs of induction modules is possible, with each pair of induction modules being constructed in the same way as described above with regard to FIGS. 1 to 6.

The drive devices 25, 31 of the induction modules C, D and drive devices 41, 42 of the induction modules E, F may be electrical or hydraulic, for example, and are shown diagrammatically. It is essential that the induction modules always be used in pairs in an induction installation and, inter alia, depending on the temperature to be achieved in the flat material and on the run-through speed of the flat material, either only one pair of induction modules can be provided or a plurality of pairs of induction modules can be used. A temperature profile T of the flat material 1 heated by the induction modules is recorded by means of a temperature-profile measuring device 43 and is fed to a position controller 44. If the recorded temperature profile T differs from a predetermined desired profile Tdes, that is to say if the temperature is non-uniform perpendicularly to the direction of movement y of the flat material, then during operation, the position controller 44 transmits corresponding control signals S1, S2, S3, S4 to the drive devices 25, 31, 41, 42 of the induction modules C, D, E, F, with the result that a change in the fine positioning of the individual induction loops of the modules takes place with the aim of making the temperature profile uniform over the width of the flat material. For this reason, the control signals S1 to S4 are fed not only to the driving devices for the upper induction loops, but of course they are fed in the same way to the drive devices for the lower induction loops (such as the drive devices 26, 32 according to FIGS. 4 and 5).

We claim:

1. An apparatus for the inductive cross-field heating of flat material, comprising:
    at least one pair of induction modules being adjustable in position independently of one another relative to a flat material to be heated, said induction modules defining a flat region for receiving the flat material to be heated,
    said flat region having edges defining a width corresponding to a width of the flat material;
    each of said induction modules including two mutually opposite U-shaped induction loops having invariable geometries and dimensions and being disposed above and below said flat region, said induction loops having base legs positioned a predetermined distance from one of said edges of said flat region and within said width of said flat region, and said induction loops having two side legs projecting a predetermined distance beyond the other of said edges of said flat region; and
    said induction loops of said pair of said induction modules being open towards oppositely directed sides and only said side legs of said induction loops each projecting beyond a respective one of said edges of said flat region.

2. The apparatus according to claim 1, wherein each of said induction modules has a framework with an upper supporting arm and a lower supporting arm for mounting said two induction loops.

3. The apparatus according to claim 2, including lamination bundles each being associated with a respective one of said induction loops for mounting said induction loops on said framework.

4. The apparatus according to claim 3, including means associated with said frameworks for varying the position of said induction loops relative to the flat material.

5. The apparatus according to claim 2, including means associated with said frameworks for varying the position of said induction loops relative to the flat material.

6. The apparatus according to claim 2, wherein said induction loops are adjustable relative to said supporting arms.

7. The apparatus according to claim 6, including lamination-bundle suspensions on said supporting arms serving as guide means for adjusting said induction loops.

8. The apparatus according to claim 7, including drive devices for adjusting said induction loops.

9. The apparatus according to claim 8, including a temperature-profile measuring device for recording a temperature profile of the flat material after inductive cross-field heating has taken place, and a position controller receiving the temperature profile from said measuring device, receiving a predetermined desired profile and controlling said drive devices for adjusting the position of said induction loops independently of deviations between the recorded temperature profile and the predetermined desired profile.

10. An apparatus for the inductive cross-field heating of flat material, comprising:

flat material to be inductively heated traveling through the apparatus, said flat material having a width and first and second edges bounding said flat material;

a pair of induction modules, said pair of induction modules being adjustable in position independently of one another relative to said flat material;

each induction module of said pair being formed by two U-shaped, mutually opposite induction loops respectively disposed above and below said flat material; said induction loops having invariable geometries and dimensions; said induction loops having base legs being positionable a predetermined distance from said first edge of said flat material within said width of said flat material; and said induction loops having two side legs projecting a predetermined distance beyond said second edge of said flat material; and only said side legs of said induction loops projecting beyond a respective one of said first and second edges of said flat material.

* * * * *